United States Patent
Tanaka et al.

[11] Patent Number: 5,855,518
[45] Date of Patent: Jan. 5, 1999

[54] DAMPER DEVICE FOR ROTARY MOTION

[75] Inventors: Hirohisa Tanaka, Meguro-Ku; Satoshi Dairokuno, Fukuroi, both of Japan

[73] Assignee: NSK Ltd., Tokyo, Japan

[21] Appl. No.: 680,917

[22] Filed: Jul. 11, 1996

[30] Foreign Application Priority Data

Jul. 17, 1995 [JP] Japan .................................. 7-180290

[51] Int. Cl.⁶ .................................................. F16D 7/00
[52] U.S. Cl. ........................................ 464/38; 192/56.33
[58] Field of Search ................................ 464/24, 30, 37, 464/38; 192/56.33

[56] References Cited

U.S. PATENT DOCUMENTS

| | | | |
|---|---|---|---|
| 2,927,672 | 3/1960 | Banner | 192/56.33 |
| 3,205,986 | 9/1965 | Kramer | 192/56.33 |
| 4,559,023 | 12/1985 | Uchibaba et al. | 464/30 |
| 4,934,500 | 6/1990 | Hanks et al. | 192/56.33 |
| 4,947,700 | 8/1990 | Kern et al. | |
| 5,070,974 | 12/1991 | Kirkwood | |
| 5,295,907 | 3/1994 | Akkerman | 192/56.33 |
| 5,680,804 | 10/1997 | Eberhart | 464/38 |

FOREIGN PATENT DOCUMENTS

| | | |
|---|---|---|
| 63-180725 | 7/1988 | Japan . |
| 2-57743 | 2/1989 | Japan . |
| 2-138241 | 11/1990 | Japan . |
| 4-236847 | 4/1992 | Japan . |

*Primary Examiner*—Eileen Dunn Lillis
*Attorney, Agent, or Firm*—Sughrue, Mion, Zinn, Macpeak & Seas, PLLC

[57] ABSTRACT

A damper device for rotary motion is disclosed which is small in size, has an excellent durability and can optionally change damping characteristics from the outside. Rotation of an input shaft is transmitted to a cylinder tube through a rotation transmitting device of loading cam type, thereby rotating an output shaft engaged with the cylinder tube through splines. When the rotational speed and torque of power to be transmitted is fluctuated, the cylinder tube is displaced against the resiliency of a conical plate spring and the volume of a pressure chamber is reduced. A viscous liquid in the pressure chamber is then discharged to the outside through a throttle hole. A relative displacement between the input and output shafts absorbs vibrations in terms of energy corresponding to the product of the mass and changes in the angular speed of members which are displaced in synch with the input shaft.

9 Claims, 13 Drawing Sheets

DAMPER DEVICE FOR ROTARY MOTION

BACKGROUND OF THE INVENTION

1. Field of the Invention

The present invention relates to a damper device for rotary motion which is called a torsional damper and is, in one embodiment, assembled in series midway a power transmitting mechanism for automobiles. The damper device for rotary motion of the present invention prevents fluctuations in the rotational speed and torque occurred on the engine side from being transmitted to the transmission side, and also effectively damps vibrations caused by the swingback after those fluctuations.

2. Description of the Prior Art

Automatic transmissions for automobiles which include automatic clutches assembled therein instead of torque converters have been researched and practiced in several models. When an automobile equipped with such an automatic clutch starts up or shifts a gear, the speed and torque of rotary motion transmitted from an engine to a propeller shaft through a transmission are greatly fluctuated the moment the automatic clutch is connected (turned on) and disconnected (turned off). If those fluctuations in the speed and torque are directly transmitted to drive wheels, there would occur shocks, causing persons in the automobile to feel uncomfortable. To eliminate such an unpleasant feeling, it is required to assemble a damper device for rotary motion midway a power transmitting mechanism for absorbing torque fluctuations produced momentarily upon tuning-on and -off of the automatic clutch. Known damper devices for rotary motion useful to that purpose are described, e.g., in the following references (1) to (4).

(1) Japanese Patent Laid-Open No. 2-57743:

A damper device for rotary motion described in the reference (1) comprises an inner ring and an outer ring which are arranged concentrically with each other, and compression coil springs disposed between inner projections jutting on an outer peripheral surface of the inner ring and outer projections jutting on an inner peripheral surface of the outer ring. In this damper device for rotary motion, the inner and outer rings serve as, for example, input and output members, respectively. When the rotational speed and torque of the power to be transmitted are fluctuated, the compression coil springs are forced to expand and contract so that both the rings are relatively displaced in the rotating direction to absorb the fluctuations in the rotational speed and torque.

(2) Japanese Patent Laid-Open No. 63-180725:

In a damper device for rotary motion described in the reference (2), rotating forces are transmitted from an input portion to an output portion through a cam unit comprised of projections and recesses arranged in the circumferential direction with balls fitted in the recesses. When the rotational speed and torque of the power to be transmitted are fluctuated, input- and output-side cam portions are relatively displaced in the circumferential and axial directions, whereupon a pair of diaphragm springs holding the cam unit between them are elastically deformed to absorb the fluctuations in the rotational speed and torque. The fluctuations in the rotational speed and torque are also damped through the rolling resistance of the balls and the friction resistance of friction members provided adjacent the cam unit.

(3) Japanese Patent Laid-Open No. 4-236847:

A damper device for rotary motion described in the reference (3) includes a cam displaceable axially upon fluctuations in the rotational speed and torque of the power to be transmitted. The displacement of the cam elastically deforms diaphragm springs which partition a damping chamber, causing a viscous liquid to come into and out of the damping chamber. The fluctuations in the rotational speed and torque are damped with the elastic deformation of the diaphragm springs and the resistance occurred upon the viscous liquid coming into and out of the damping chamber.

(4) Japanese Patent Laid-Open No. 2-138241:

In a damper device for rotary motion described in the reference (4), an outer peripheral surface of a first rotary shaft and an inner peripheral surface of a splined tube are engaged with each other through helical splines. The splined tube is loosely fitted in an outer tube to be axially displaceable, the outer tube being fixed to the end of a second rotary shaft and filled with oil therein. With the rotation of the first rotary shaft, the splined tube is displaced axially in the outer tube while fluctuations in the rotational speed and torque of the power applied to the first rotary shaft are absorbed through the viscous resistance of the oil.

Any of the conventional damper devices for rotary motion described in the references (1) to (4) can absorb the fluctuations in the rotational speed and torque of the power applied to the rotary shaft on the input side, and can prevent the fluctuations from being directly transmitted to the rotary shaft on the output side. However, the following problems to be solved still remain with regard to, e.g., difficulties in achieving the small size and high damping performance.

First, in the damper device for rotary motion described in the reference (1), because of the structure bearing total torque of an engine by the plurality of compression coil springs, it is required to increase the wire diameter of each compression coil spring so that the torque can be borne by the compression coil springs. This results in difficulties in reducing the size and weight of the damper device for rotary motion. Particularly, in the case where the entire length of the compression coil spring is increased to enlarge the working angular range (i.e., the angular range where rotation variations can be absorbed by the damper device for rotary motion), the size of the damper device for rotary motion is increased remarkably. The reason is that the spring constant of the compression coil spring, which is reduced as a result from increasing the entire length of the compression coil spring to enlarge the working angular range, must be compensated for (prevented from lowering) by increasing the wire diameter. Here, in order to enable the compression coil springs to bear the large torque transmitted from the engine, the spring constant is required to be more than a certain value.

The damper device for rotary motion described in the reference (1) includes a damper in which a viscous liquid is interposed between planes extending perpendicularly to the axis and given with forces in the shearing direction, for the purpose of preventing the swingback of rotations after the fluctuations in the rotational speed and torque (i.e., damping reciprocal vibrations in the rotating direction). With such a structure, however, the surfaces facing each other with the viscous liquid between them must be finished into highly accurate planes free from any warps, etc., resulting in the increased machining cost. Further, the reference (1) describes that grease is employed as the viscous liquid to achieve higher damping performance. In the damper device for rotary motion which is assembled in an automatic transmission, however, it is difficult to seal off the grease from an automatic fluid (ATF). This raises the problem that a sealing device requires a large cost, or the grease may mix into the ATF and expedite deterioration of the ATF.

The above disadvantages are not limited to the damper device for rotary motion described in the reference (1), but common to all similar damper devices, i.e., damper devices for rotary motion including compression coil springs arranged in the radial direction (in point of increasing the size), and damper devices for rotary motion utilizing viscosity of grease to attain a vibration damping function (in points of difficulties in sealing-off and deterioration of the ATF).

In the damper device for rotary motion described in the reference (2), the use of the diaphragm springs increases a diameter of the entire device. Also, since the fluctuations in the rotational speed and torque are damped through the rolling resistance and the friction resistance, sufficient damping performance cannot be always achieved. Additionally, wears of the sliding friction surfaces and a reduction in the damping performance due to deterioration over time, etc. are not negligible. This makes it difficult to ensure a satisfactory durability.

In the damper device for rotary motion described in the reference (3), the use of the diaphragm springs increases a diameter of the entire device as with the damper device described in the reference (2). Also, since the hydraulic pressure near an outer periphery of the damping chamber is raised due to centrifugal forces, the damping performance is inevitably greatly affected by such a partial rise of the hydraulic pressure and achieving stable damping performance is difficult. Further, because of using a sliding cam, wears of the friction surfaces are not negligible and a satisfactory durability is not positively ensured. In addition, it is thought that the damping chamber must be made sufficiently oil tight to achieve the desired damping performance, but it is difficult to keep a cam portion, for example, to be sufficiently oil tight and to practically achieve the desired damping performance.

In the damper device for rotary motion described in the reference (4), since the portions engaging through the helical splines are frictionally engaged with each other, wear accumulated during long term use is not negligible. Also, because of the oil being sealed off in the outer tube, if the splined tube is abruptly and largely displaced in the axial direction due to abrupt and large torque fluctuations, cavitations may occur in the oil within the outer tube (on the lower pressure side), or the pressure may be excessively raised (oil pressure boost due to the pumping action). Air bubbles generated with the cavitations bring a reduction in damping performance, and the oil pressure boost due to the pumping action brings a reduction in durability of the outer tube.

Further, in any of the damper devices for rotary motion described in the references (1) to (4), the damping performance cannot be adjusted from the mechanical point of view and, therefore, a sufficient vibration damping effect cannot be always developed for the reasons (a) to (c) as follows:

(a) In the structure utilizing viscosity of a viscous liquid such as oil to dampen vibrations, the vibration damping effect is greatly varied with changes in viscosity depending on temperature changes, and stable performance cannot be achieved.

(b) Intelligent functions have recently been more and more incorporated in automobiles and, in the near future, operating conditions of an automatic transmission including an automatic clutch will be controlled depending on the engine rotational speed and the vehicle speed in many models. In this case, the damping performance of a damper device for rotary motion will be required to be finely adjusted depending on the engine rotational speed and the vehicle speed. However, the known damper devices for rotary motion described above cannot meet such a demand.

(c) There are difficulties in satisfying both damping characteristics which are required in the occurrence of low-frequency vibrations, and damping characteristics which are required in the occurrence of high-frequency vibrations. More specifically, low-frequency vibrations, which are caused by resonation between the vehicle weight and springs in a damper due to shocks generated upon turning-on and -off of the automatic clutch or shocks produced upon abrupt speed-up and slowdown, must be damped quickly. To this end, the damping effect with a viscous liquid such as oil must be increased. On the contrary, if the damping effect is increased too much, the torque transmission rate would be elevated in the range where high-frequency vibrations are applied. This would result in that high-frequency vibrations transmitted from the engine side to the damper device for rotary motion, such as torque fluctuations ascribed to lags in the engine ignition timing, are substantially directly transmitted to the downstream in the transmitting direction. Thus, the damping characteristics required for damper devices utilizing a viscous liquid, etc. may be reversed depending on the purposes. However, the conventional damper devices of the fixed structure unable to adjust the damping performance cannot sufficiently meet such requirements.

SUMMARY OF THE INVENTION

The present invention has been made in view of the state of art as set forth above, and its object is to provide a damper device for rotary motion which can meet all of the following requirements (A) to (D).

(A) A sufficiently wide working angular range is ensured. Even if the torque of rotary motion is fluctuated over a wide angular range, these torque fluctuations can be absorbed satisfactorily.

(B) The structure which is free from wear of components by employing a viscous liquid to damp vibrations, which is not affected by an oil pressure rise due to centrifugal forces, and which can prevent the occurrence of pumping action and cavitations, is realized.

(C) The structure which is easy to manufacture and small in size is realized.

(D) The structure which allows damping characteristics to be adjusted from the outside is realized.

Of the thus-constructed damper devices for rotary motion of the present invention, that one according to one aspect of the invention operates as follows to prevent vibrations in the rotating direction caused by fluctuations in the rotational speed and torque from being transmitted between the input side member and the output side member. When the speed and torque of rotating power applied to the input side member are fluctuated, the positional relationship between the input side member and the output side member is changed in the rotating direction against the resiliency of the elastic member. This change contributes to preventing fluctuations in the rotational speed and torque of the input side member (vibrations in the rotating direction) from being transmitted to the output side member. Thus, as the positional relationship between the input side member and the output side member is changed in the rotating direction, fluctuations in the rotational speed and torque of the input side member are prevented from being transmitted to the output side member. Also, with such a change in the positional relationship in the rotating direction, the members displaced in synch with the input side member, such as an engine piston and a flywheel, are out of phase from the members displaced in synch with the output side member, such as a propeller shaft, wheels and a vehicle body. As a result, the torque fluctuations are absorbed on the input side depending on the mass (inertia) of the members displaced in synch with the input side member, and are prevented from being transmitted to the output side. Further, when the positional relationship between the input side member and the output side member is changed in the rotating direction to prevent the fluctuations in the rotational speed and torque of the input side member from being transmitted to the output side member, the volume of the hydraulic chamber is reduced corresponding to the change in the positional relationship. With this reduction in the volume of the hydraulic chamber, the viscous liquid supplied to the hydraulic chamber through the supply passage is discharged to the outside through the throttle passage. The discharge of the viscous liquid is so quickly performed as to prevent the transmission of the vibrations, whereby the fluctuations in the rotational speed and torque are prevented from being transmitted to the output side member. Additionally, the capability of absorbing the fluctuations in the rotational speed and torque can be adjusted by changing the amount or pressure of the viscous liquid supplied to the pressure chamber through the supply passage.

The damper device for rotary motion according to another aspect of the invention operates as follows to prevent vibrations in the rotating direction caused by fluctuations in the rotational speed and torque from being transmitted between the first shaft and the second shaft. Rotary motion of the first shaft used as an input shaft, for example, are transmitted from the second cam surface to the first cam surface through the rolling member and then from the cylinder tube to the second shaft used as an output shaft, for example. When the speed and torque of the rotary motion applied to the first shaft are fluctuated, the amount by which the rolling member moves over the first and second cam surfaces is changed. For example, if the rotational speed and torque are abruptly increased, the amount by which the rolling member moves over the first and second cam surfaces is also increased. As a result, the cam plate and the cylinder end plate are relatively moved away from each other against the resiliency of the elastic member, thereby reducing the volume of the hydraulic chamber defined between the cylinder end plate and the piston end plate. With this reduction in the volume of the hydraulic chamber, the viscous liquid supplied to the hydraulic chamber through the supply passage is discharged to the outside through the throttle passage. Thus, with much the same action as the damper device for rotary motion according to the previous aspect of the invention, the torque fluctuations are prevented from being transmitted to the second shaft. The capability of absorbing the torque fluctuations can also be adjusted by changing the amount or pressure of the viscous liquid supplied to the pressure chamber. The operation of the damper device for rotary motions according to yet another aspect of the invention is the same as that of the damper device for rotary motion according to the above aspect of the invention.

The damper device for rotary motions according to still another aspect of the invention operates as follows to prevent vibrations in the rotating direction caused by fluctuations in the rotational speed and torque from being transmitted between the inner member and the outer member. In the damper device for one of the inner and outer members is used as the input side member and the other is used as the output side member. For example, when the inner member is used as the input side member, rotary motion of the inner member is transmitted from the inner projections to the outer member through the elastic members and the outer projections. When the speed and torque of the rotary motion applied to the inner member are fluctuated, the amounts of elastic deformations of the elastic members are varied. For example, if the rotational speed and torque are abruptly increased, the amounts of elastic deformations of the elastic members are increased correspondingly. As a result, the volumes of the plural pressure chambers defined between the outer projections and the inner projections adjacent each other in the circumferential direction are reduced. With this reduction in the volume of the hydraulic chamber, the viscous liquid supplied to the hydraulic chamber through the supply passage is discharged to the outside through the throttle passage. Thus, with much the same action as the damper devices for rotary motion according to all the above aspects of the invention, the torque fluctuations are prevented from being transmitted to the second shaft. The capability of absorbing the torque fluctuations can also be adjusted by changing the amount or pressure of the viscous liquid supplied to the pressure chamber.

DESCRIPTION OF THE PREFERRED EMBODIMENTS

FIGS. 1 to 5 show a first embodiment of the present invention corresponding. A damper device 1 for rotary motion of this embodiment is, for example, assembled in series midway a power transmitting mechanism which constitutes part of a driving system of automobiles and transmits driving forces of an engine to wheels. The damper device 1 for rotary motion serves to prevent fluctuations in the rotational speed and torque caused upon turning-on and -off of an automatic clutch, for example, from being transmitted to the wheels.

Figure 1:
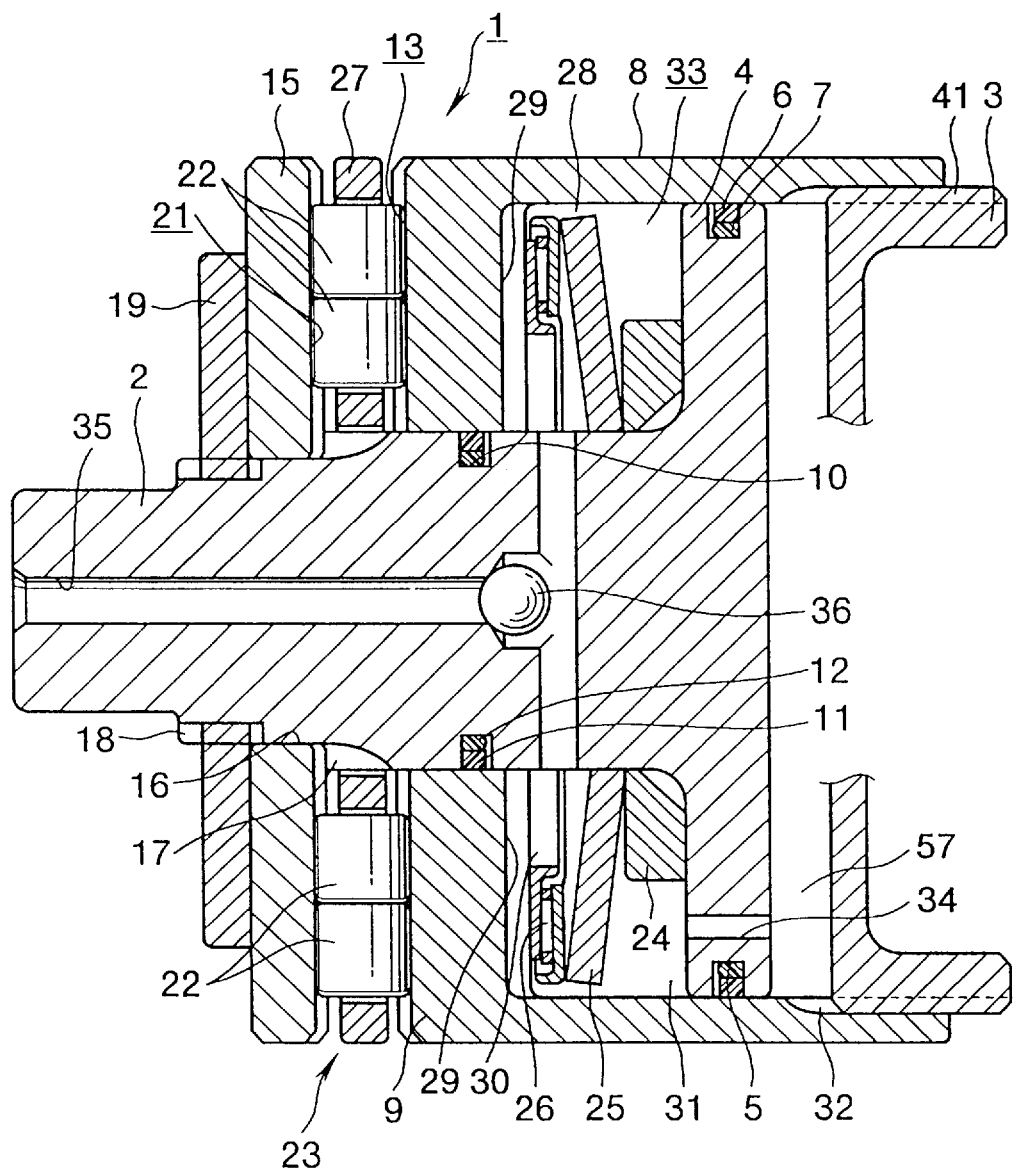
FIG. 1 is a sectional view showing a first embodiment of the present invention.

The damper device 1 for rotary motion comprises an input shaft 2 as a first shaft connected to an output portion of the automatic clutch, and an output shaft 3 as a second shaft connected to an input portion of an automatic transmission body, for example, the input and output shafts 2, 3 being arranged respectively at front and rear ends in the axial direction (the back-and-forth direction is defined with respect to the direction in which power is transmitted such that left and right ends in FIG. 1 are respectively the front and rear ends). An outwardly flanged piston end plate 4 is fixed to a rear end of the input shaft 2. The piston end plate 4 has an outer peripheral edge which is concentrical with the input shaft 2 and includes a hold groove 5 formed therein. In the hold groove 5, there are fitted an annular piston ring 6 and an elastic ring 7, such as an O-ring, for elastically pressing the piston ring 6 outwardly diametrically. An outer peripheral edge of the piston ring 6 is in sliding contact with an inner peripheral surface of a cylinder tube 8. The piston ring 6 is preferably made of synthetic resin which has resistance against oil, elasticity and the low coefficient of friction, such as polytetrafluoroethylene (PTFE) and polyacetal.

A cylinder end plate 9 in the annulus form is fixed to an inner peripheral surface of the cylinder tube 8 at its front end, and an inner peripheral edge of the cylinder end plate 9 is positioned adjacent an outer peripheral surface of the input shaft 2 in its intermediate portion. A hold groove 10 is formed in a part of the outer peripheral surface of the input shaft 2 in its intermediate portion which confronts the inner peripheral edge of the cylinder end plate 9. In the hold groove 10, there are fitted a seal ring 11 made as with the piston ring 6 and an elastic ring 12, such as an O-ring, for elastically pressing the seal ring 11 outwardly diametrically. An outer peripheral edge of the seal ring 11 is in sliding contact with the inner peripheral edge of the cylinder end plate 9. The seal ring 11 is kept in slide contact with the inner peripheral edge of the cylinder end plate 9 over a full stroke range of the cylinder tube 8. To this end, the length of the inner peripheral edge of the cylinder end plate 9 in the axial direction (i.e., the left-to-right direction in FIG. 1) is selected to such an extent that the inner peripheral edge of the cylinder end plate 9 can maintain sliding contact with the seal ring 11 over the full stroke range. As a modification, if the hold groove 10 is formed in the inner peripheral edge of the cylinder end plate 9 rather than the outer peripheral surface of the input shaft 2 in its intermediate portion and an outer peripheral edge of the seal ring 11 is held in sliding contact with the outer peripheral surface of the input shaft 2 in its intermediate portion, it is no longer required to set the length of the inner peripheral edge of the cylinder end plate 9 in the axial direction to such a large size as covering the full stroke range.

Figure 2:
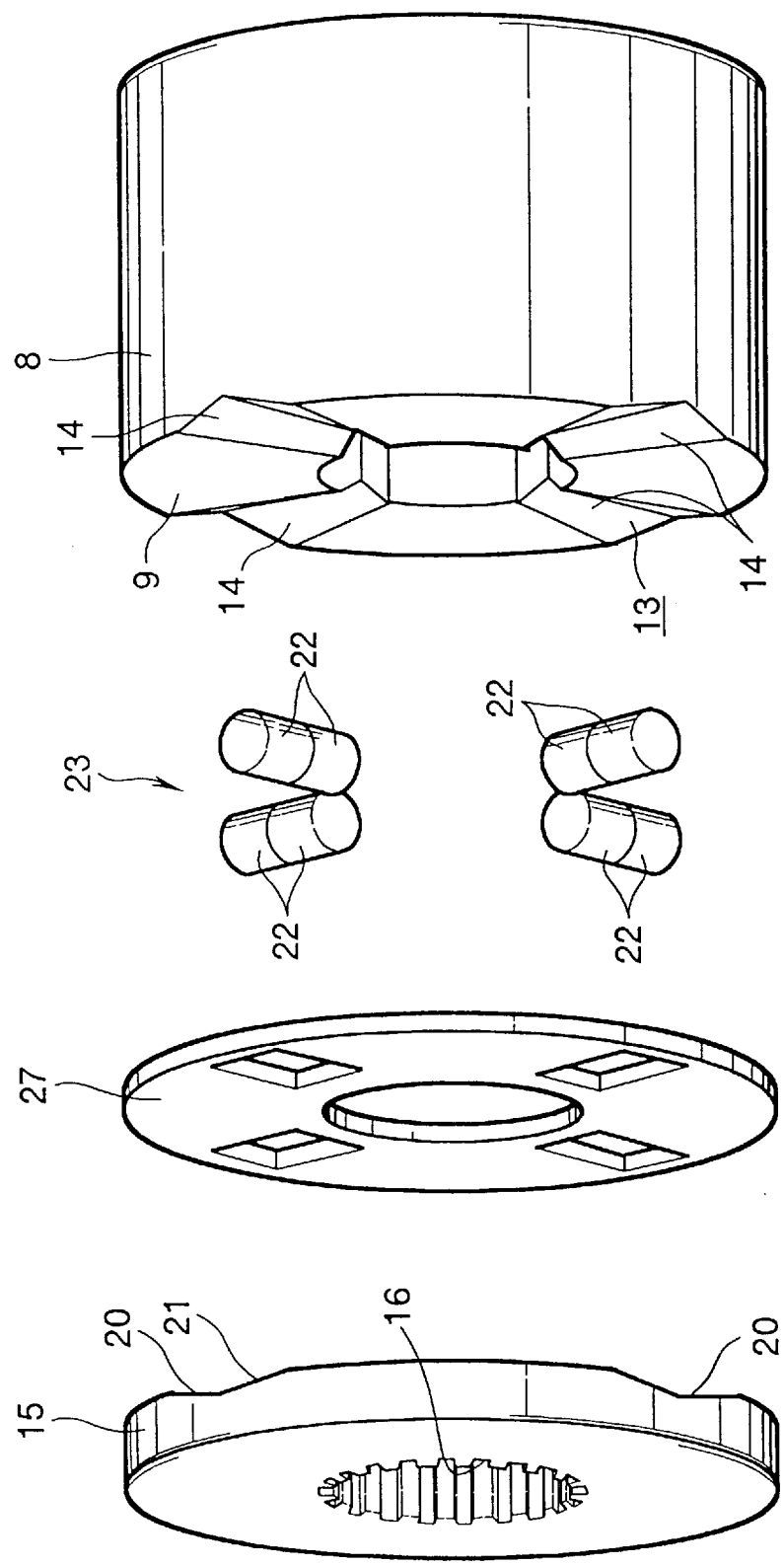
FIG. 2 is an exploded perspective view showing components of a rotation transmitting device.

A first cam surface 13 is formed in an outer side (left side in FIGS. 1 to 4) of the cylinder end plate 9. As shown in FIGS. 2 and 3, the first cam surface 13 is formed as a circumferentially undulated surface by forming V-shaped recesses 14, 14 in the outer side of the cylinder end plate 9 at a plurality (four in the illustrated embodiment) of locations with equal intervals in the circumferential direction.

Around the intermediate portion of the input shaft 2 at a position closer to the front side (left side in FIG. 1) than the cylinder end plate 9, a cam plate 15 is supported in such a manner that it is prohibited from not only displacing in the direction away from the first cam surface 13 (in the leftward direction in FIGS. 1 to 4), but also rotating relative to the input shaft 2. More specifically, spline grooves 16 formed in a central edge portion of the cam plate 15 are engaged with spline keys 17 formed on the outer peripheral surface of the input shaft 2 in its intermediate portion so that the rotation of the input shaft 2 is directly transmitted to the cam plate 15. A nut 19 is screwed to a male threaded portion 18 which is formed on the outer peripheral surface of the input shaft 2 in its intermediate portion at a position closer to the front side (left side in FIG. 1) than the spline keys 17, thereby holding a front surface (left surface in FIG. 1) of the cam plate 15 in place. Accordingly, the cam plate 15 is unable to move forwardly from the condition shown in FIG. 1. A second cam surface 21 is formed as a circumferentially undulated surface by forming V-shaped recesses 20, 20 in a rear surface (right surface in FIG. 1) of the cam plate 15, as with the first cam surface 13.

A plurality of rollers 22, 22 as rolling members are held between the second cam surface 21 and the first cam surface 13 to thereby constitute a rotation transmitting device 23 of loading cam type. The rotation transmitting device 23 transmits rotating forces from the input shaft 2 to the cylinder end plate 9 with rotation of the input shaft 2, and also presses the cylinder end plate 9 rearwardly (to the right in FIG. 1). The rollers 22, 22 are held by a retainer 27 in a rollable manner. Therefore, the rotation center axes of the rollers 22, 22 are prevented from deviating radially with respect to the input shaft 2, and the pitch between the rollers 22, 22 adjacent in the circumferential direction is prevented from changing from the pitch of the recesses 14, 20 formed in the cam surfaces 13, 21.

On the other hand, between an inner surface (defining a front surface, i.e., left surface in FIG. 1) of the piston end plate 4 and an inner surface (defining a rear surface, i.e., right surface in FIG. 1) of the cylinder end plate 9, there are disposed axially in series a spacer 24 in the annulus form, a conical plate spring 25 as an elastic member, and a thrust needle bearing 26 as a thrust bearing in this order from the rear side toward the front side. Outer diameters of the conical plate spring 25 and the thrust needle bearing 26 are set to be sufficiently smaller than an inner diameter of the cylinder tube 8. Therefore, an annular oil passage gap 28 having a sufficient width is formed between outer peripheral edges of both the conical plate spring 25 and the thrust needle bearing 26 and the inner peripheral surface of the cylinder tube 8. A plurality of grooves 29, 29 extending in the radial direction are formed in the inner surface of the cylinder end plate 9. A spacer 30 located between the conical plate spring 25 and the cylinder end plate 9 on the radially inner side of the thrust needle bearing 26 is communicated with a space 31 located between the conical plate spring 25 and the piston end plate 4 on the radially outer side of the spacer 24 through the grooves 29, 29 and the oil passage gap 28.

Female spline grooves 32 are formed in the inner peripheral surface of the cylinder tube 8 in its rear end portion. Male spline keys 41 formed in an outer peripheral surface of the output shaft 3 are engaged in the female spline grooves 32. Accordingly, the output shaft 3 is arranged in concentrical relation to the input shaft 2 and is rotated in synch with the cylinder tube 8 while engaging the cylinder tube 8 in such a manner that it is relatively displaceable only in the axial direction. The output shaft 3 itself, in the form of a bottom-equipped cylinder, is supported in such a manner that it is just rotatable and will not displace in the back-and-forth direction.

A pressure chamber 33 is defined by the inner surface of the piston end plate 4, the inner surface of the cylinder end plate 9, the outer peripheral surface of the input shaft 2, and the inner peripheral surface of the cylinder tube 8. Both the spaces 30, 31, as well as the grooves 29, 29 and the oil passage gap 28 communicating the spaces 30, 31 with each other therethrough are present in the pressure chamber 33. A throttle hole 34 is formed in a part of the piston end plate 4 to serve as a throttle passage for communicating the pressure chamber 33 with the outside.

An oil passage hole 35 is formed inside the input shaft 2 to serve as a supply passage for supplying an ATF as a viscous liquid into the pressure chamber 33. The oil passage hole 35 has an upstream end opened in a front end surface of the input shaft 2, and a downstream end opened in the outer peripheral surface of the input shaft 2 in its intermediate portion at a position within the pressure chamber 33. A ball-type check valve 36 as backflow preventing means is disposed in series midway the oil passage hole 35. The check valve 36 functions to supply the ATF only in the direction toward the pressure chamber 33. For easier installation, the check valve 36 may be provided in any other suitable location than illustrated so long as it can fulfill the proper function.

Figure 4:
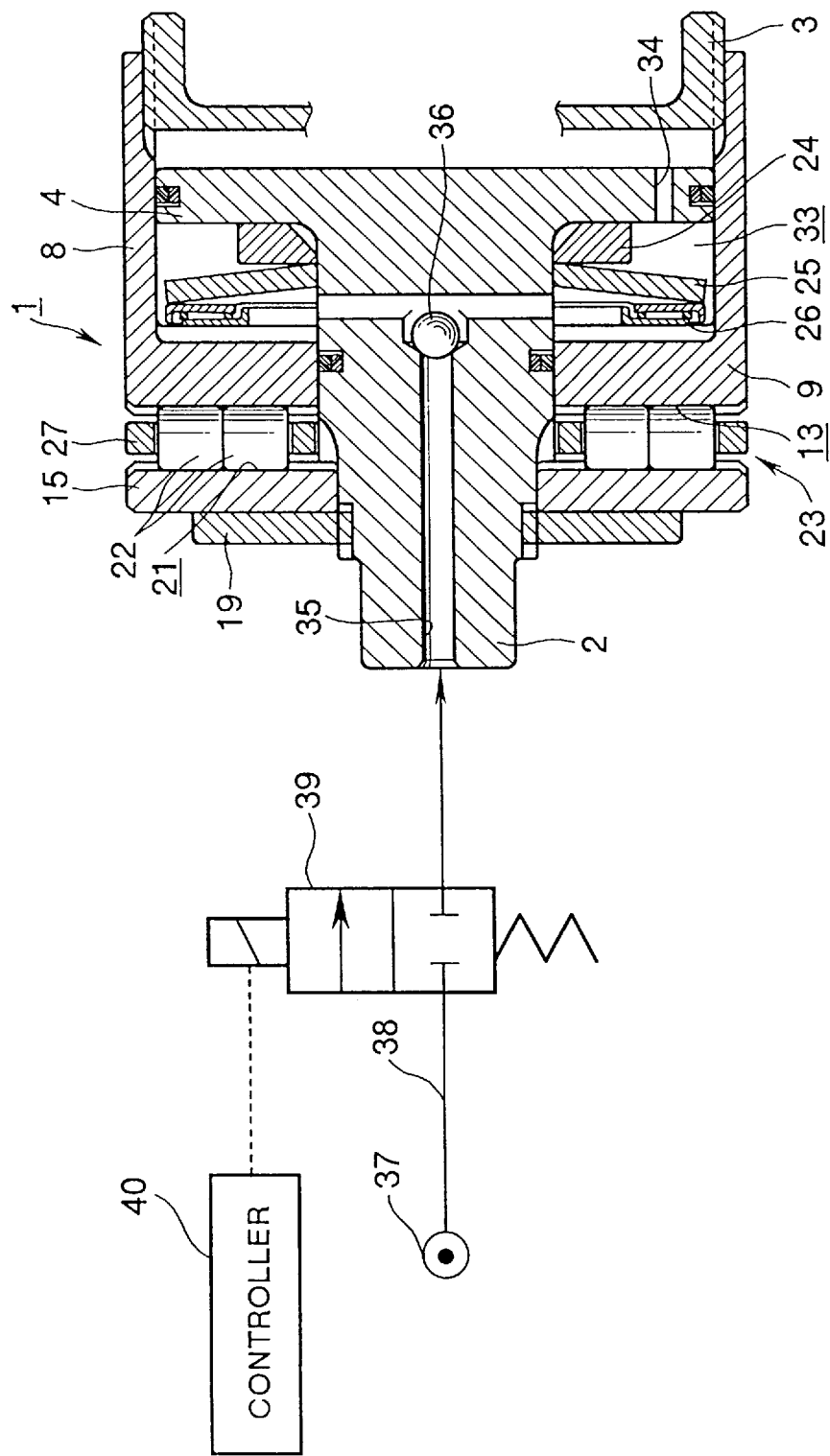
FIG. 4 is a sectional view including a hydraulic circuit assembled to adjust vibration damping performance of a damper device.

To the damper device 1 for rotary motion constructed as explained above, the ATF is supplied with a hydraulic circuit as shown in FIG. 4. A hydraulic source 37 such as a pump sucks and pressurizes the ATF existing within the body of the automatic transmission, and then delivers the ATF to an oil supply passage 38. An adjusting control valve 39 is provided midway the oil supply passage 38. The control valve 39 may have any suitable structure being electrically adjustable and may be, e.g., a needle or spool type adjusting valve capable of continuous adjustment. An opening degree of the control valve 39 is adjusted in accordance with a signal from a controller 40 to regulate the amount or pressure (including simultaneous regulation of both the amount and pressure) of the ATF supplied to the pressure chamber 33 via the oil supply passage 38 and the oil passage hole 35. Alternatively, the control valve 39 may be a solenoid on/off valve which is electromagnetically driven to open and close at a high speed for regulating the amount or pressure of the ATF. In this case, the time for which the control valve 39 is kept open or closed is adjusted in accordance with a signal from the controller 40 to regulate the amount or pressure of the ATF supplied to the pressure chamber 33. In any case, the opening degree of the control valve 39 is set so that when it is maximized, the ATF can be supplied to the pressure chamber 33 through the oil passage hole 35 in a larger amount than discharged from the pressure chamber 33 through the throttle hole 34. Note that the hydraulic circuit is just required to have the structure capable of adjusting a supply condition of the ATF into the pressure chamber 33, and is not limited to the illustrated structure.

The damper device 1 for rotary motion constructed as explained above and supplied with the ATF to the pressure chamber 33 through the foregoing hydraulic circuit operates as follows to prevent vibrations in the rotating direction caused by fluctuations in the rotational speed and torque from being transmitted between the input shaft 2 and the output shaft 3. Incidentally, rotary motion applied from the output portion of the automatic clutch to the input shaft 2 is transmitted from the second cam surface 21 to the first cam surface 13 through the rollers 22, 33 and then from the cylinder tube 8 to the output shaft 3.

Figure 3A:
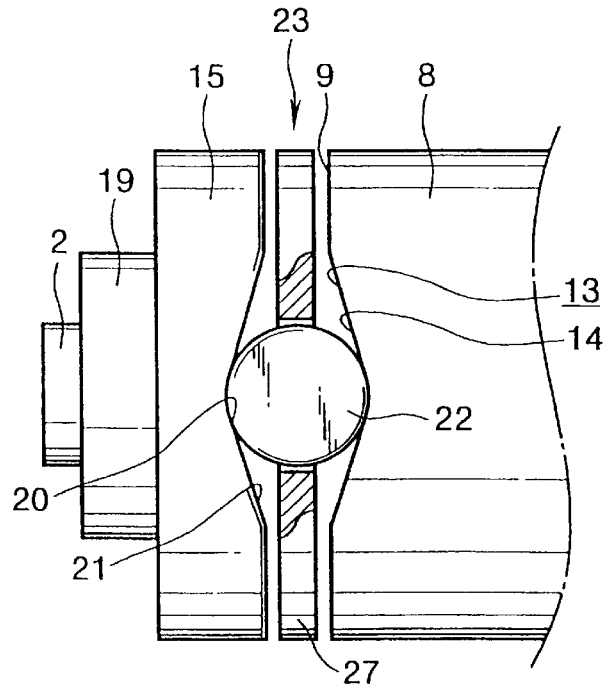
FIGS. 3A and 3B are plan views of FIG. 1 with a rotation transmitting device portion partly cut away, the views showing respectively an inoperative state and an operative state.

First, when no rotary motion is applied from the automatic clutch to the input shaft 2, the distance between the piston end plate 4 and the cylinder end plate 9 is increased with the resiliency of the conical plate spring 25. In this condition, as shown in FIG. 3A, the rollers 22 constituting the rotation transmitting device 23 are positioned at the bottom of the recesses 14, 20 in the first and second cam surfaces 13, 21. Accordingly, the distance between the cylinder end plate 9 and the cam plate 15 is minimized and, to the contrary, the volume of the pressure chamber 33 is maximized.

Figure 3B:
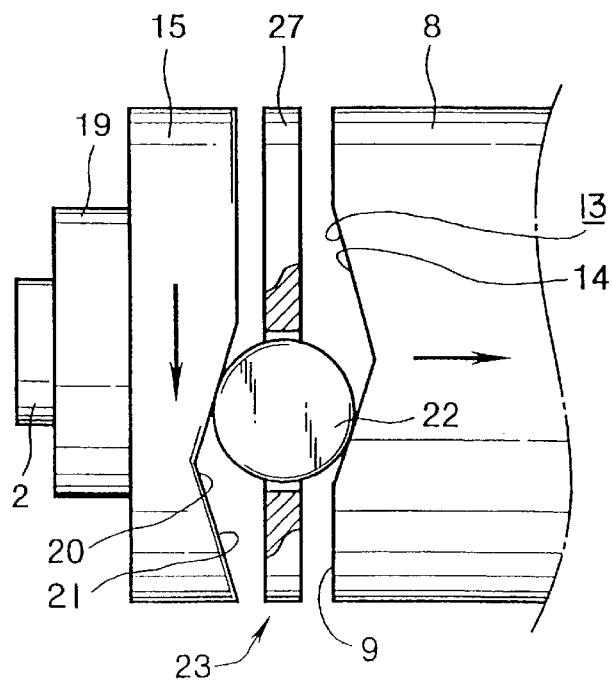

When rotary motion is applied to the input shaft 2 in the above condition, the rollers 22 are dislodged from the recesses 14, 20 in the first and second cam surfaces 13, 21 (to move over the cam surfaces 13, 21), as shown in FIG. 3B. As the rollers 22 move over the cam surfaces 13, 21, the cylinder end plate 9 is displaced against the resiliency of the conical plate spring 25 and the volume of the pressure chamber 33 is reduced. At this time, at the points where rolling surfaces of the rollers 22 contact the first and second cam surfaces 13, 21, forces depending on the torque to be transmitted are applied to the cam surfaces 13, 21 at the contact points in the direction vertical thereto. With the circumferential components of the applied forces, the cylinder tube 8 fixed to the cylinder end plate 9 is rotated together with the cam plate 15 fixed to the input shaft 2. The rotation of the cylinder tube 8 is transmitted to the output shaft 3 through the female spline grooves 32 and the male spline keys 41. The axial position of the output shaft 3 remains the same even when the position of the cylinder tube 8 is displaced in the back-and-forth direction, as described later.

Figure 5A:
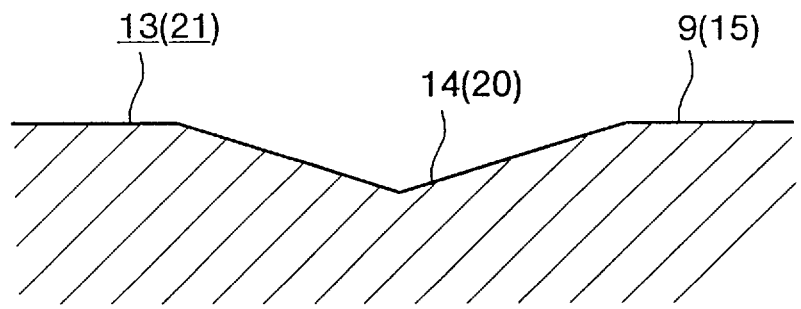
FIG. 5A is a sectional view showing one example of circumferential sectional configurations of a recess formed in each cam surface.
Figure 5B:
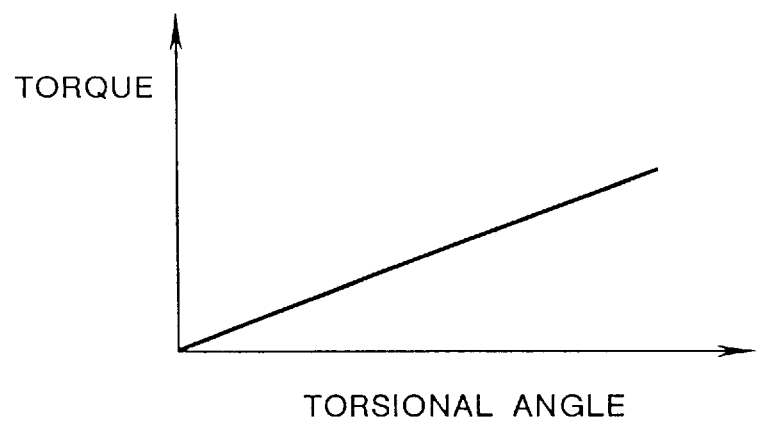
FIG. 5B is a graph showing the relationship between a torsional angle of an input shaft with respect to an output shaft and transmitted torque resulted from using the sectional configuration shown in FIG. 5A.

With the axial components of the above applied forces, the cylinder tube 8 fixed to the cylinder end plate 9 is pushed rearwardly to reduce the volume of the pressure chamber 33. At the same time, the forces caused by the resiliency of the conical plate spring 25 and the hydraulic pressure in the pressure chamber 33 are applied to the cylinder end plate 9 as forces pushing the cylinder tube 8 forwardly. Therefore, the rearward displacement of the cylinder tube 8 is stopped in a state where the axial component forces are balanced by the forwardly pushing forces applied to the cylinder tube 8 based on the resiliency of the conical plate spring 25 and the hydraulic pressure in the pressure chamber 33. Unless the speed and torque of the rotary motion to be transmitted are fluctuated and the hydraulic pressure in the pressure chamber 33 is fluctuated, the axial position of the cylinder tube 8 remains the same and so do the contact positions between the rolling surfaces of the rollers 22, 22 and the first and second cam surfaces 13, 21. For example, on condition that the recesses 14, 20 constituting the first and second cam surfaces 13, 21 are formed linearly in a V-shape as shown in FIGS. 2, 3 and 5A, only one conical plate spring 25 is provided in the pressure chamber 25, and the hydraulic pressure in the pressure chamber 33 is not varied, the relationship of the relative displacement (torsional angle) between the first and second cam surfaces 13, 21 versus the magnitude of torque transmitted between both the cam surfaces is linear as shown in FIG. 5B. Of course, the torsional angle is proportional to the rearward displacement of the cylinder tube 8.

When the speed and torque of the rotary motion applied to the input shaft 2 are fluctuated, the amounts by which the rollers 22, 22 move over the first and second cam surfaces 13, 21 are changed. For example, if the speed and torque are abruptly increased, the amounts by which the rollers 22, 22 move over the cam surfaces 13, 21 are also increased. As a result, the cam plate 15 and the cylinder end plate 9 are relatively moved away from each other against the resiliency of the conical plate spring 25 and the hydraulic pressure in the pressure chamber 33, thereby reducing the volume of the hydraulic chamber 33 defined between the cylinder end plate 9 and the piston end plate 4. At this time, the cylinder end plate 9 having the first cam surface 13 and the cam plate 15 supported on the input shaft 2 are relatively displaced in the rotating direction. The fluctuations in the rotational speed and torque are absorbed corresponding to such a relative displacement. A relative displacement of the input shaft 2 and the piston end plate 4 with respect to the cylinder tube 8, the cylinder end plate 9 and the output shaft 3 is absorbed by the thrust needle bearing 26.

In the damper device 1 for rotary motion of the present invention, since relatively displacing portions subjected to a large surface pressure, in particular, are engaged with each other through not sliding contact but rolling contact, wear of the components can be minimized. More specifically, of the relatively displacing portions subjected to a large surface pressure, the first relatively displacing portions comprising the cylinder end plate 9 and the cam plate 15 are engaged with each other through rolling contact with the rollers 22, 22 therebetween. The second relatively displacing portions comprising the cylinder end plate 9 and the conical plate spring 25 are engaged with each other through rolling contact with the thrust needle bearing 26 therebetween. As a result, the components will not be significantly worn even with the use for a long term and a satisfactory durability can be ensured.

As the volume of the hydraulic chamber 33 reduces due to the fluctuations in the rotational speed and torque, the ATF filled in the hydraulic chamber 33 is discharged through the throttle hole 34. At this time, the check valve 36 is closed to prevent the ATF from flowing back to the oil passage hole 35. Accordingly, the above discharge of the ATF from the hydraulic chamber 33 is effected through the throttle hole 34, and the volume of the hydraulic chamber 33 is reduced depending on the amount of the ATF discharged. Then, vibrations brought by the fluctuations in the rotational speed and torque are prevented from being transmitted to the output shaft 3 as a result of the relative displacement between the input and output shafts 2, 3 in the rotating direction corresponding to such a reduction in the volume of the hydraulic chamber 33.

During the above relative displacement, energy of $\Delta\omega\cdot I$ is consumed without being transmitted to the output shaft 3. In that formula, I represents the total inertia of all the members in the rotating direction which are positioned on the side nearer to the engine than the cylinder end plate 9 and are displaced in synch with the input shaft 2, and $\Delta\omega$ represents a change in the angular speed of the members on the same side as the input shaft 2. More specifically, as the positional relationship between the input and output shafts 2, 3 is changed in the rotating direction, the members displaced in synch with the input shaft 2, such as an engine piston, a crankshaft and a flywheel, are out of phase from the members displaced in synch with the output shaft 3, such as a propeller shaft, wheels and a vehicle body. As a result, torque fluctuations bringing about vibrations in the rotating direction are absorbed depending on the mass (inertia) of the members displaced in synch with the input shaft 2. When the positional relationship between the input and output shafts 2, 3 is thus changed to prevent the fluctuations in the rotational speed and torque of the input shaft 2 from being transmitted to the output shaft 3, the volume of the hydraulic chamber 33 is reduced corresponding to the change in the positional relationship. With this reduction in the volume of the hydraulic chamber 33, the ATF supplied to the hydraulic chamber 33 through the oil passage hole 35 constituting the supply passage is discharged through the throttle hole 34 constituting the throttle passage. The discharge of the ATF is quickly performed so as to prevent the transmission of the vibrations, whereby the fluctuations in the rotational speed and torque are prevented from being transmitted to the output shaft 3.

The capability of absorbing the fluctuations in the rotational speed and torque can be adjusted by changing the amount or pressure of the ATF supplied to the pressure chamber 3 through the oil passage hole 35. Of course, the fluctuations in the rotational speed and torque are also consumed and reduced through the friction resistance between the components and the torque in the rotating direction resulted from conversion of the viscous resistance produced when the ATF flows out through the oil passage hole 35.

When the rotational speed and torque which have increased abruptly upon the fluctuations are returned to normal values (for the rotational speed, it is stabilized), the amounts by which the rollers 22, 22 move over the first and second cam surfaces 13, 21 are also returned to normal values. Then, the cam plate 15 and the cylinder end plate 9 come closer to each other with the resiliency of the conical plate spring 25 and the hydraulic pressure in the pressure chamber 33, thereby increasing the volume of the hydraulic chamber 33. This increase in the volume of the hydraulic chamber 33 is compensated for by the ATF supplied through the oil passage hole 35. An oil reservoir 57 is defined between the outer surface (right surface in FIG. 1) of the piston end plate 4 and the output shaft 3. The ATF discharged through the throttle hole 34 is once stored in the oil reservoir 57 and then drained to the outside. Accordingly, when the volume of the hydraulic chamber 33 is increased, air is sucked in no way into the hydraulic chamber 33 through the throttle hole 34.

In the damper device 1 for rotary motion of the present invention, as described above, vibrations in the rotating direction caused by fluctuations in the rotational speed and torque are less transmitted by relatively displacing the input and output shafts 2, 3 while changing the volume of the hydraulic chamber 33. On this occasion, there is no possibility that the pressure of the ATF in the pressure chamber 33 is excessively elevated owing to centrifugal forces or the pumping action, or that air bubbles are generated in the ATF with cavitations. Stated otherwise, in the damper device 1 for rotary motion of the present invention, it is possible to ensure the wide working angular range and the high damping performance from the mechanical point of view even if the damper device is designed to be compact, and hence to reduce the entire diameter of the entire device. Therefore, the inner diameter of the pressure chamber 33 can be reduced and, correspondingly, centrifugal forces acting on the ATF in the pressure chamber 33 are also reduced so as to suppress a hydraulic pressure rise due to the centrifugal forces. As a result, vibration damping characteristics are not remarkably varied between a state of low-speed operation and a state of high-speed operation.

Further, the ATF in the pressure chamber 33 is always replaced by being supplied through the oil passage hole 35 and discharged through the throttle hole 34. Accordingly, the piston end plate 4 reciprocally moving in the cylinder tube 8 in the axial direction will not produce the pumping action. As a result, the vibration damping characteristics can be prevented from deviating from desired ones with an unexpected rise of the hydraulic pressure in the pressure chamber 33.

Additionally, when the volume of the pressure chamber 33 is increased, the new ATF is replenished through the oil passage hole 35 to avoid an excessive drop of the hydraulic pressure in the pressure chamber 33. Accordingly, the ATF in the pressure chamber 33 can be kept free from air bubbles otherwise generated with cavitations. As a result, it is possible to prevent a deterioration of the damping performance otherwise caused by the presence of air bubbles as a compressive fluid.

The vibrations due to swingback of the fluctuations in the rotational speed and torque are damped with the ATF in the pressure chamber 33 which produces resistance against changes in the volume of the pressure chamber 33. The damping performance based on the presence of the pressure chamber 33 can be adjusted by regulating a supply condition of the ATF into the pressure chamber 33 through the oil passage hole 35. For example, if the opening degree of the control valve 39 is increased (or the open time thereof is prolonged) to supply a larger amount of the ATF into the pressure chamber 33 than discharged through the throttle hole 34, the damping performance is increased. Conversely, if the opening degree of the control valve 39 is reduced (or the open time thereof is shortened) to supply a smaller amount of the ATF into the pressure chamber 33, the damping performance is reduced. Thus, in the latter case, the cylinder end plate 9 is more easily displaced rearwardly, which results in that larger fluctuations in the rotational speed can be absorbed, while the capability of damping the swingback of vibrations is lowered.

Accordingly, even during running of automobiles, the damper device 1 for rotary motion can be adjusted from the outside in its capabilities of absorbing fluctuations in the rotational speed and torque. For example, when there occurs swingback of vibrations upon the connection of the automatic clutch or quick speed-up and slowdown, the ATF is supplied in a larger amount to the pressure chamber 33 to increase the damping performance of the damper device 1 for rotary motion, thereby quickly damping the low-frequency vibrations caused by shocks due to the clutch connection or quick speed-up and slowdown. On the other hand, when there occurs high-frequency vibrations because of shifts in the engine ignition timing, the ATF is supplied in a smaller amount to the pressure chamber 33 to reduce the damping performance of the damper device 1 for rotary motion, thereby absorbing fine fluctuations in the rotational speed which are ascribed to the high-frequency vibrations.

As will be apparent from the above description, the pressure chamber 33 is communicated with the outside through the throttle hole 34, and the pressure chamber 33 is not required to be completely sealed off from the outside. Therefore, the throttle passage for communicating the pressure chamber 33 and the outside with each other is not limited to the throttle hole 34 as illustrated, but may be practiced in any of various forms such as a throttle hole formed in a part of the cylinder tube 8, and a throttle passage formed in the sliding portions between the outer peripheral edge of the piston end plate 4 and the inner peripheral surface of the cylinder tube 8 or the sliding portions between the inner peripheral edge of the cylinder end plate 9 and the outer peripheral surface of the input shaft 2. Further, the input and output shafts 2, 3 may be employed in a reversed manner (such that the right and left sides in FIG. 1 are set respectively as the input and output sides).

Figure 6A:
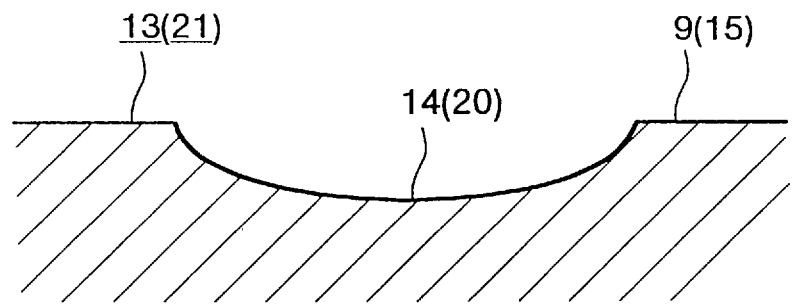
FIG. 6A is a sectional view showing a second example of circumferential sectional configurations of the recess formed in each cam surface.
Figure 6B:
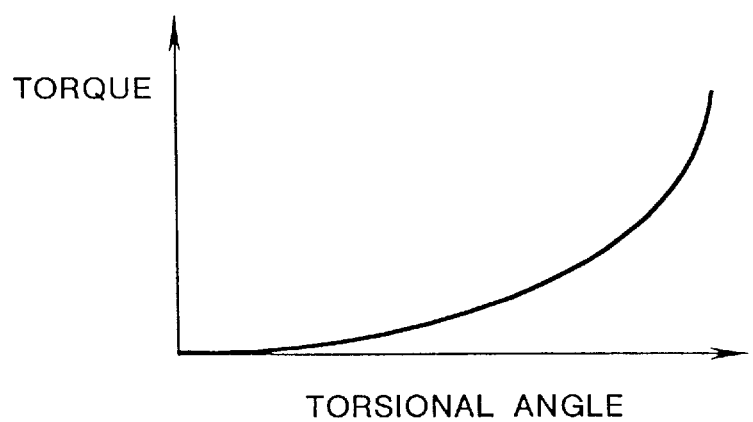
FIG. 6B is a graph showing the relationship between a torsional angle of an input shaft with respect to an output shaft and transmitted torque resulted from using the sectional configuration shown in FIG. 6A.

FIG. 6 illustrates a second embodiment of the present invention corresponding. In this embodiment, the recesses 14 constituting the first cam surface 13 formed in the outer side of the cylinder end plate 9 (and the recesses 20 constituting the second cam surface 21 in the facing side of the cam plate 15) are each semielliptical in sectional shape as shown in FIG. 6A. By so forming the sectional shape of the recesses 14, 20 constituting the first and second cam surface 13, 21, the relationship of the relative displacement (torsional angle) between the first and second cam surfaces 13, 21 versus the magnitude of torque transmitted between both the cam surfaces is represented by a curve, as shown in FIG. 6B, meaning that as the torsional angle increases, the transmitted torque is abruptly increased. Thus, according to the damper device 1 for rotary motion of the present invention, characteristics of transmitting the torque and characteristics of absorbing fluctuations in the rotational speed and torque can be adjusted by modifying the sectional shape of the recesses 14, 20 constituting the first and second cam surface 13, 21.

Figure 7:
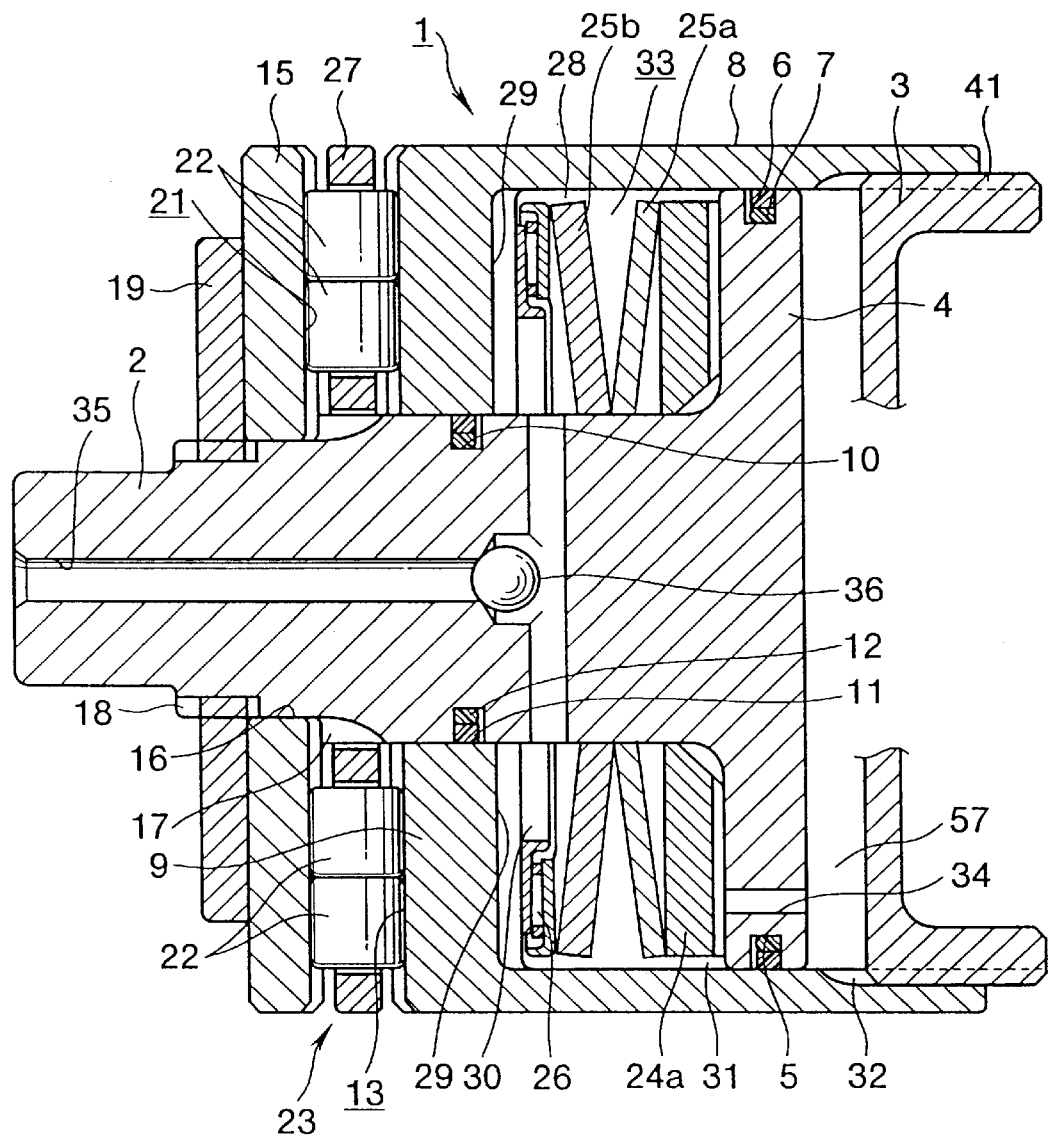
FIG. 7 is a sectional view showing a third embodiment of the present invention.

FIG. 7 illustrates a third embodiment of the present invention corresponding. In this embodiment, two conical plate springs 25a, 25b are disposed in series within the pressure chamber 33 between the spacer 24a and the thrust needle bearing 26. Of these two conical plate springs 25a, 25b, one 25a (on the right side in FIG. 7) is selected to have smaller resiliency than the other 25b (on the left side in FIG. 7). In this embodiment, therefore, the resiliency for pressing the cylinder tube 8 rearwardly (to the right in FIG. 7) is not changed linearly. The rate at which the resiliency increases depending on the torsional angle is enlarged from halfway the full stroke range in this embodiment. Thus, according to the damper device 1 for rotary motion of the present invention, characteristics of transmitting the torque and characteristics of absorbing fluctuations in the rotational speed and torque can be adjusted by modifying characteristics of the resiliency changes which variously produce resistance against the displacement of the cylinder tube 8.

Figure 8:
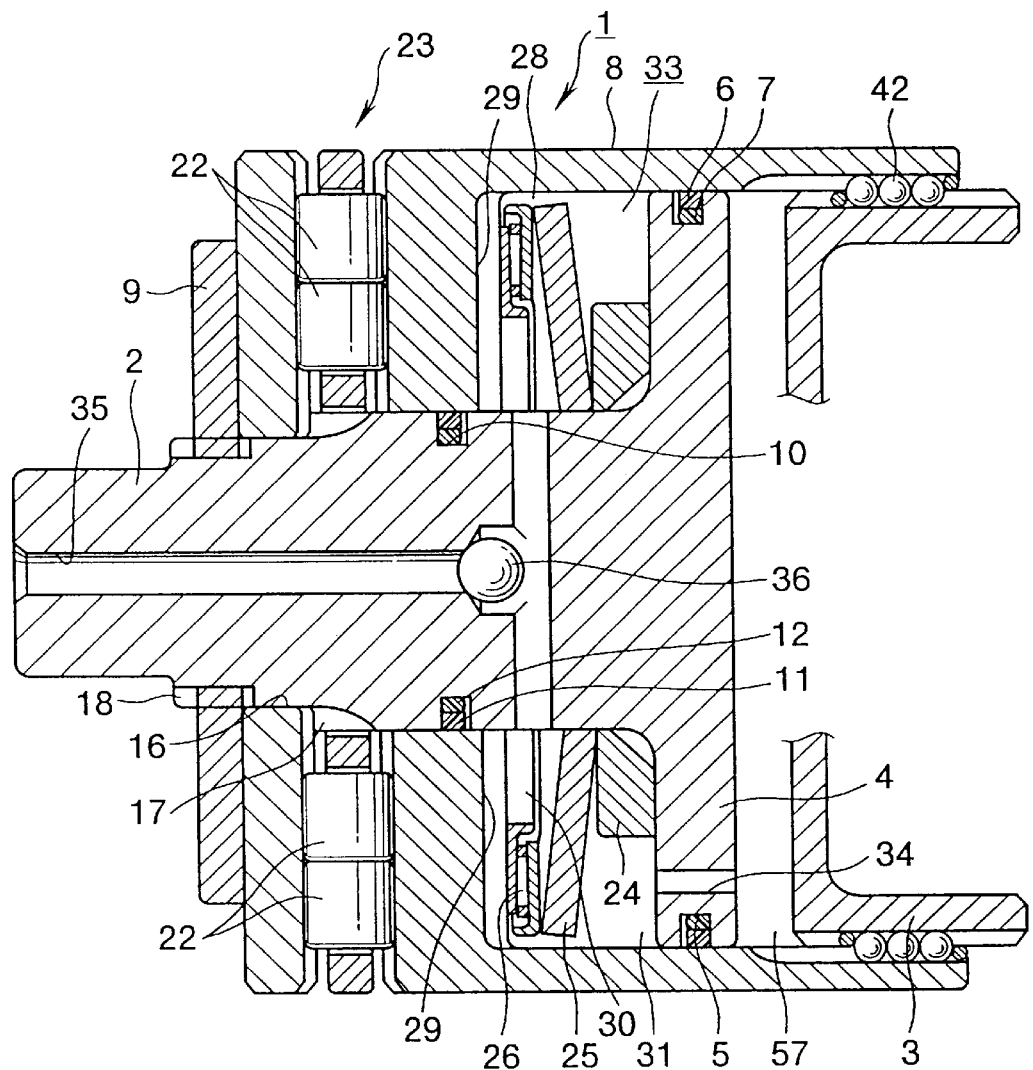
FIG. 8 is a sectional view showing a fourth embodiment of the present invention.

FIG. 8 illustrates a fourth embodiment of the present invention corresponding. In this embodiment, the inner peripheral surface of the cylinder tube 8 in its rear end portion (right end portion in FIG. 8) and the outer peripheral surface of the output shaft 3 are engaged with each other through ball splines 42. In this embodiment, therefore, when the cylinder tube 8 is displaced back and forth, friction forces acting on the engaging portions between the inner peripheral surface of the cylinder tube 8 in its rear end portion and the outer peripheral surface of the output shaft 3 is relieved and the power loss generated in the engaging portions can be reduced.

Figure 9:
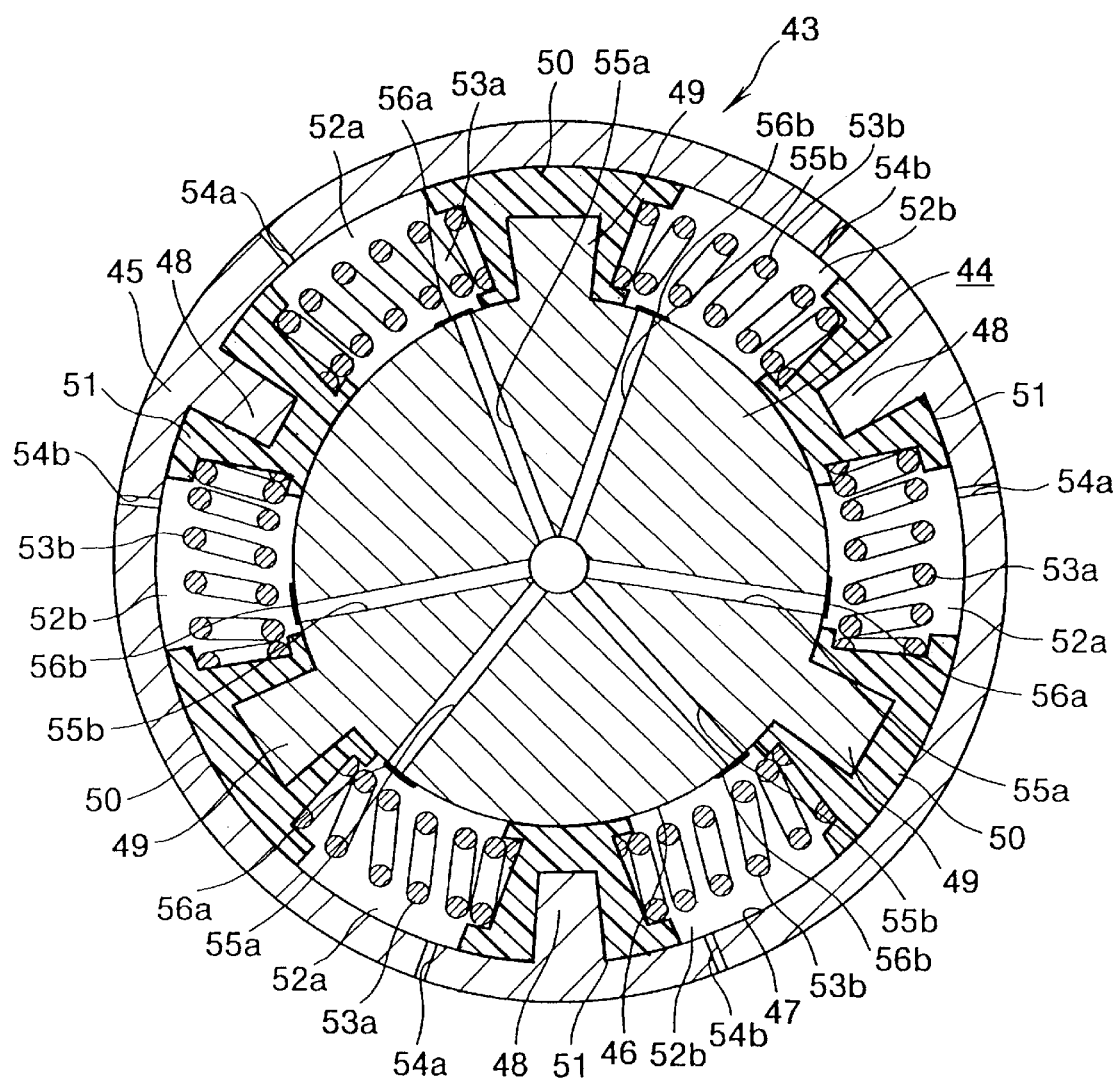
FIG. 9 is a sectional view showing a fifth embodiment of the present invention.
Figure 10:
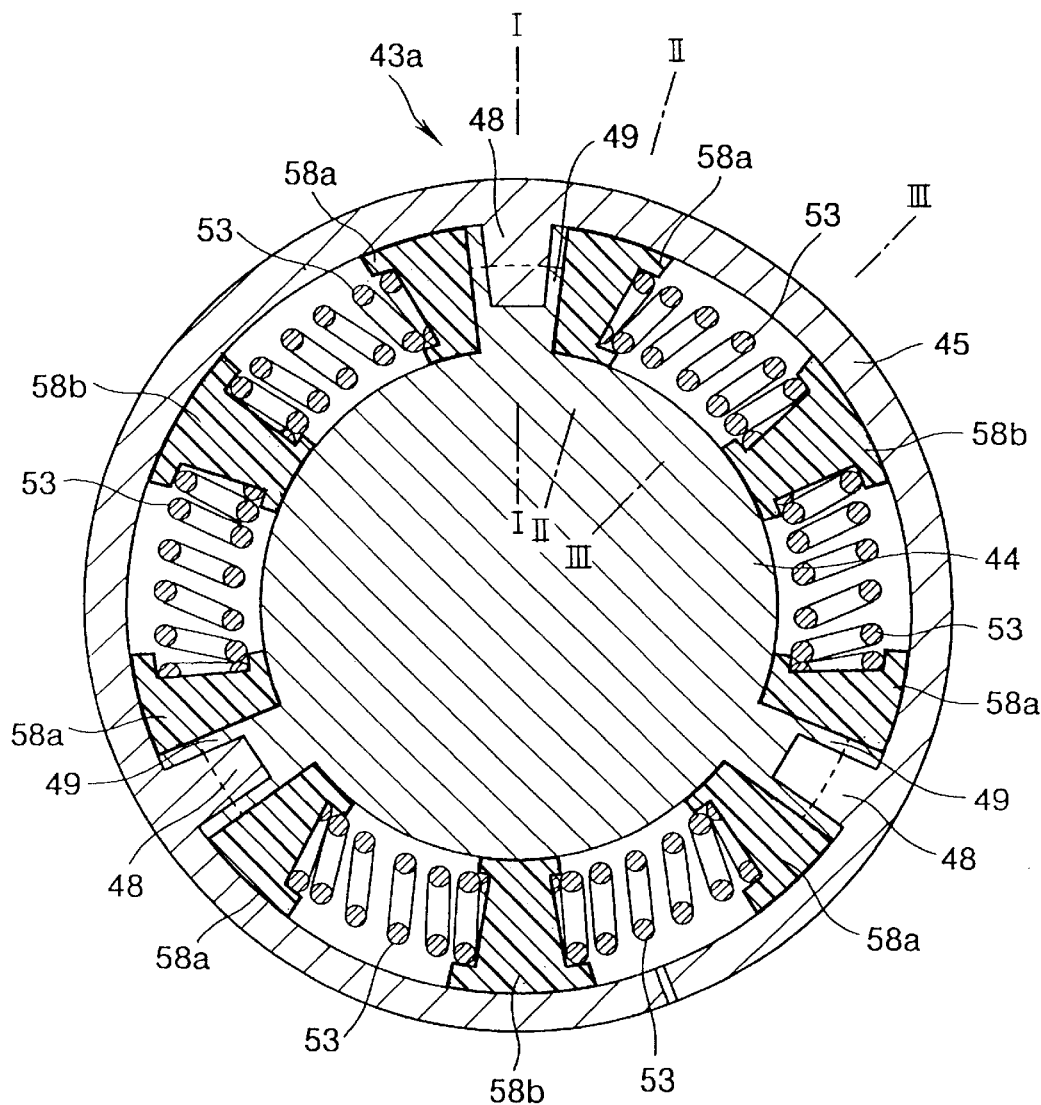
FIG. 10 is a sectional view showing a sixth embodiment of the present invention.
Figure 11:
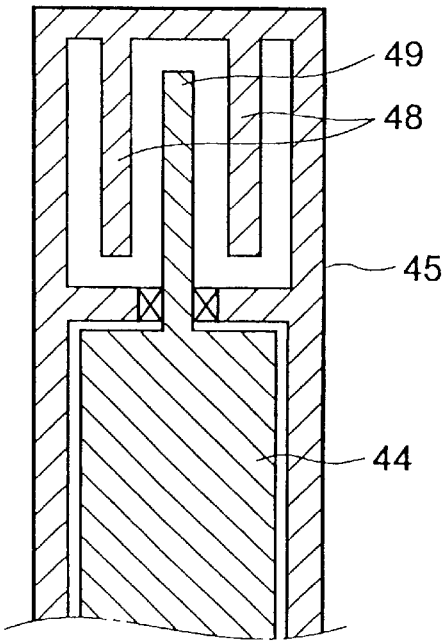
FIG. 11 is a sectional view taken along I—I in FIG. 10.
Figure 12:
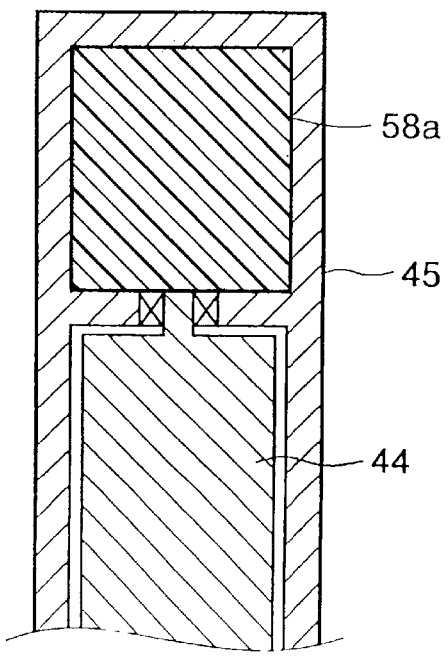
FIG. 12 is a sectional view taken along II—II in FIG. 10.
Figure 13:
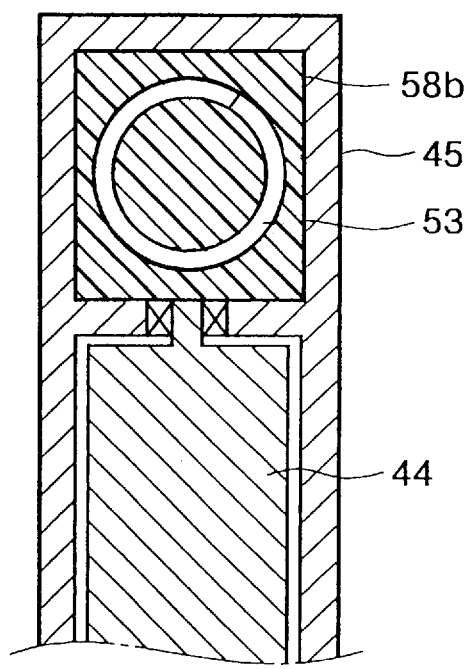
FIG. 13 is a sectional view taken along III—III in FIG. 10.

FIG. 9 illustrates a fifth embodiment of the present invention corresponding. A damper device 43 for rotary motion of this embodiment comprises an output board 44 as an inner member and an input board 45 as an outer member. The output board 44 has a cylindrical outer peripheral surface 46 and the input board 45 has a cylindrical inner peripheral surface 47. These input and output boards 45, 44 are concentrically arranged to be relatively rotatable with the outer and inner peripheral surfaces 46, 47 opposed to each other.

Outer projections 48, 48 are fixedly provided on the inner peripheral surface 47 of the input board 45 at a plurality (three in the illustrated embodiment) of locations with equal intervals in the circumferential direction. Also, inner projections 49, 49 are fixedly provided on the outer peripheral surface 46 of the output board 44 at a plurality (three in the illustrated embodiment) of locations out of phase from the outer projections 48, 48 in the circumferential direction. Gaps between tips of the inner projections 49, 49 and the inner peripheral surface 47 of the input board 45 and gaps between tips of the outer projections 48, 48 and the outer peripheral surface 46 of the output board 44 are sealed off by sealing member 50, 51, respectively.

Spaces between the inner projections 49, 49 and the outer projections 48, 48 adjacent each other in the circumferential direction serve as pressure chambers 52a, 52b. The pressure chambers 52a, 52b are defined three in number for each, i.e., total six, and closed by end plates (not shown) at both end openings on the front and rear sides of the drawing sheet to prevent an ATF in the pressure chambers 52a, 52b from flowing out. Compression coil springs 53a, 53b as elastic members are disposed in the pressure chambers 52a, 52b and stretched between the inner projections 49, 49 and the outer projections 48, 48 adjacent each other in the circumferential direction. Therefore, when the input and output boards 45, 44 are relatively rotated in either rotating direction, each board is always subjected to resistance by some compression coil springs 53a, 53a (or 53b, 53b) (i.e., displaced against resiliency). Simultaneously, of the pressure chambers 52a, 52b provided in plural number for each, the volumes of some pressure chambers 52a, 52a (or 52b, 52b) are increased, whereas the volumes of the remaining pressure chambers 52b, 52b (or 52a, 52a) are reduced.

Throttle holes 54a, 54b serving as throttle passages are formed to penetrate the input board 45 at a plurality (six in the illustrated embodiment) of locations in the circumferential direction for communicating the pressure chambers 52a, 52b with the outside. Inside the output board 44, there are formed supply passages 55a, 55b for supplying an ATF as a viscous liquid to the pressure chambers 52a, 52b. Reed-type check valves 56a, 56b as backflow preventing means are disposed on the outer peripheral surface 46 of the output board 44 in positions to cover openings of the supply passages 55a, 55b. The check valves 56a, 56b are arranged in series with respect to the supply passages 55a, 55b and function to supply the ATF only in the direction toward the pressure chambers 52a, 52b.

The damper device 43 for rotary motion constructed as explained above operates as follows to prevent vibrations in the rotating direction caused by fluctuations in the rotational speed and torque from being transmitted between the input board 45 and the output board 44. More specifically, rotary motion of the input board 45 is transmitted from the outer projections 48, 48 to the output board 44 through some compression coil springs 53a, 53a (or 53b, 53b) and the inner projections 49, 49. When the rotational speed and torque of the rotary motion applied to the input board 45 are fluctuated, the amounts of elastic deformations of the compression coil springs 53a, 53a (or 53b, 53b) are varied. For example, if the rotational speed and torque are abruptly increased, the amounts of elastic deformations of the compression coil springs 53a, 53a (or 53b, 53b) are increased correspondingly. As a result, the volumes of the plural pressure chambers 52a, 52a (or 52b, 52b) defined between the outer projections 48, 48 and the inner projections 49, 49 adjacent each other in the circumferential direction are reduced.

With such a reduction in the volumes of the pressure chambers 52a, 52a (or 52b, 52b), the ATF supplied to the pressure chambers 52a, 52a (or 52b, 52b) through the supply passages 55a, 55a (or 55b, 55b) is discharged to the outside through the throttle holes 54a, 54a (or 54b, 54b). In this way, the relative displacement between the input and output boards 45, 44 in the rotating direction prevents the fluctuations in the rotational speed and torque applied to the input board 45 from being transmitted to the output board 44. At the same time, the viscous resistance produced between the ATF and the throttle holes 54a, 54a (or 54b, 54b) functions to hold down vibrations ascribable to the fluctuations in the rotational speed and torque. The damping performance that affects the capability of absorbing the fluctuations in the rotational speed and torque can be adjusted by regulating a supply condition of the ATF into the pressure chambers 52a, 52a (or 52b, 52b). Also in this embodiment, the input and output sides may be exchanged such that the inner and outer members serve as respectively the input and output sides.

FIGS. 10 to 14 illustrate a sixth embodiment of the present invention corresponding. In this embodiment, the outer projections 48, 48 and the inner projections 49, 49 are in phase with each other in a neutral state so that a sufficient relative displacement (stroke) between the input and output boards 45, 44 in the rotating direction is ensured. For this purpose, in this embodiment, the outer projections 48, 48 are each divided into plural parts in the direction of thickness, allowing the inner projections 49, 49 to enter gaps between the divided outer projections 48, 48. Sealing members 58a, 58b are fitted between the outer peripheral surface of the input board 44 and the inner peripheral surface of the input board 45 so as to be slidable in the circumferential direction.

Figure 14:
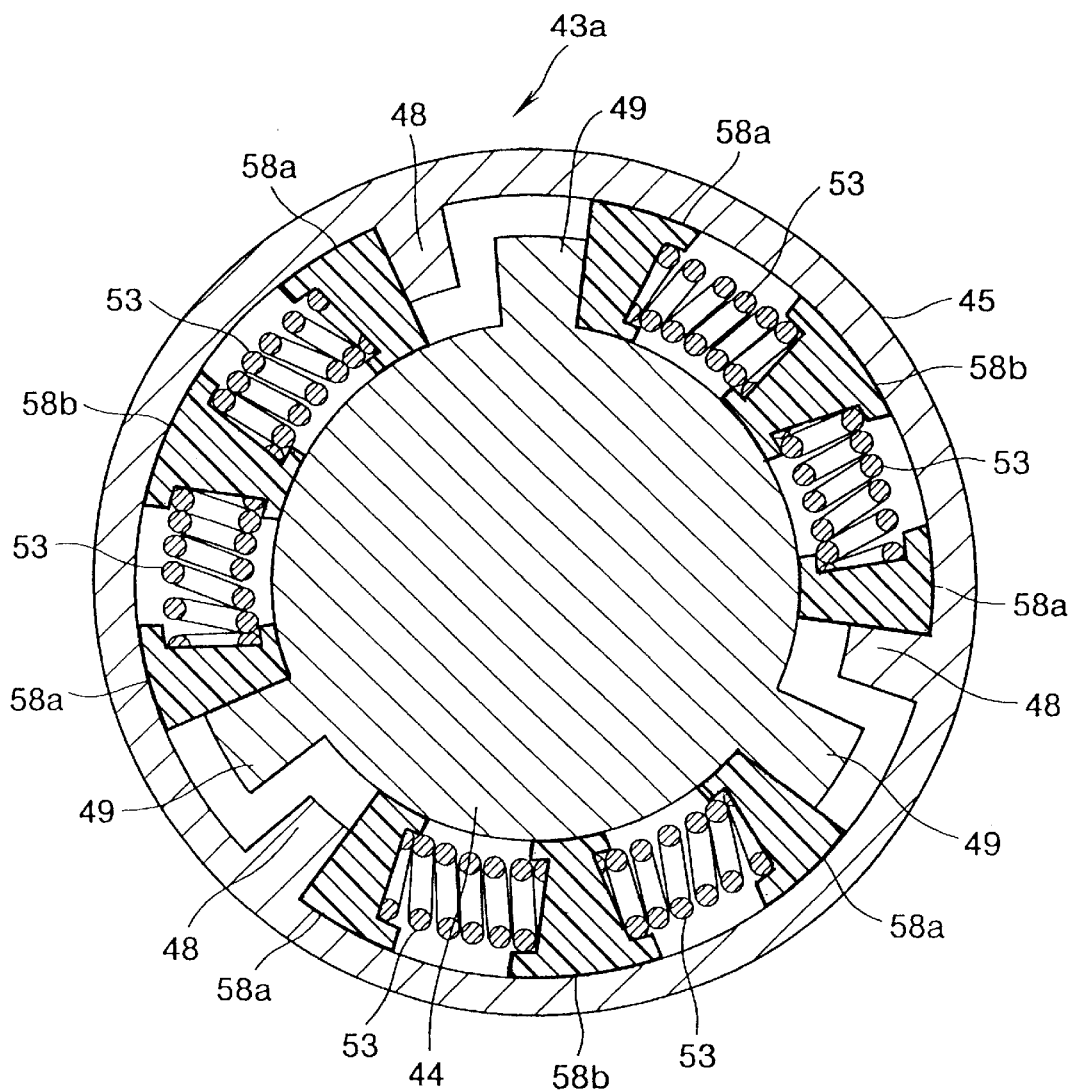
FIG. 14 is a sectional view showing a condition where an output board and an input board are out of phase.

In a damper device 43a for rotary motion of this embodiment constructed as explained above, when the input and output boards 45, 44 are relatively rotated to be out of phase in the circumferential direction, assemblies each comprising a pair of compression coil springs 53, 53, a pair of sealing members 58a, 58a and a single sealing member 58b are elastically compressed between the outer projections 48, 48 and the inner projections 49, 49, as shown in FIG. 14. The reason why the pair of compression coil springs 53, 53 are abutted with each other through the sealing member 58b in this embodiment is that if the length of the compression coil springs 53, 53 is too large, the compression coil springs 53, 53 may be buckled and desired repulsion forces cannot be obtained. Note that since this embodiment is featured in the structure for ensuring a sufficient stroke in the rotating direction, the similar parts, such as the oil supply passages, to those in the above fifth embodiment are omitted from the figures and are not described here.

The damper device for rotary motion of the present invention, which is constructed and operates as described above, can provide excellent advantages (A) to (D) below.

(A) A sufficiently wide working angular range can be ensured. Even if the rotational speed and torque of rotary motion are fluctuated over a wide angular range, these fluctuations in the rotational speed and torque can be absorbed satisfactorily. As a result, the sufficient capability of absorbing the fluctuations in the rotational speed and torque can be developed over a wide angular range.

(B) Since vibrations are damped with a viscous liquid which is always replaced through repetition of supply and discharge, there can be realized the structure which is free from wear of the components and can prevent the occurrence of pumping action and cavitations. As a result, it is possible to ensure a sufficient durability and stabilize the performance.

(C) The structure which is easy to manufacture and small in size can be realized. As a result, the structure capable of being installed in a limited space within an automatic transmission can be realized inexpensively, which further contributes to facilitating the design of the automatic transmission and reducing the manufacturing cost. A reduction in size is also advantageous in suppressing a hydraulic pressure rise ascribed to centrifugal forces to be as small as possible.

(D) The structure which allows damping characteristics to be adjusted from the outside can be realized. As a result, in step with more advanced intelligent functions incorporated in automobiles, operating conditions of an automatic transmission including an automatic clutch can be finely controlled depending on the engine rotational speed and the vehicle speed. It is also possible to highly satisfy both damping characteristics which are required in the occurrence of low-frequency vibrations to damp these vibrations, and damping characteristics which are required in the occurrence of high-frequency vibrations to damp these vibrations.

What is claimed is:

1. A damper device for rotary motion comprising:

a first shaft, an outwardly flanged piston end plate having an outer peripheral edge concentrically with said first shaft and fixed to an end of said first shaft, a cylinder tube having an inner peripheral surface positioned at least one of close to and in sliding contact with the outer peripheral edge of said piston end plate, an inwardly flanged cylinder end plate having an inner peripheral edge positioned at least one of close to and in sliding contact with an outer peripheral surface of said first shaft in an intermediate portion, a first cam surface formed as a circumferentially undulated surface in an outer side of said cylinder end plate, a cam plate supported on the intermediate portion of said first shaft in such a manner that said cam plate is prohibited from displacement in a direction away from said first cam surface, and from rotating relative to said first shaft, a second cam surface formed as a circumferentially undulated surface in one side of said cam plate, a rolling member arranged rollably between said second cam surface and said first cam surface, an elastic member and a thrust bearing arranged in series in the axial direction between an inner surface of said piston end plate and an inner surface of said cylinder end plate, a second shaft arranged concentrically with said first shaft and engaging said cylinder tube to be displaceable only in the axial direction, a pressure chamber defined by an inner surface of said piston end plate, an inner surface of said cylinder end plate, the outer peripheral surface of said first shaft and the inner peripheral surface of said cylinder tube, a throttle passage for communicating said pressure chamber with the outside, a supply passage for supplying a viscous liquid to said pressure chamber, and backflow preventing means disposed adjacent to and midway a downstream opening of said supply passage for supplying the viscous fluid only in a direction toward said pressure chamber.

2. A damper device according to claim 1, wherein adjusting means for regulating at least one of the amount and pressure of the viscous liquid supplied to said pressure chamber is disposed midway said supply passage, said adjusting means being able to regulate a supply condition of the viscous liquid into said pressure chamber.

3. A damper device according to claim 1, wherein a hold groove is formed in an outer peripheral edge of said piston end plate, and an annular piston ring and an elastic ring for elastically pressing said piston ring are fitted in said hold groove.

4. A damper device according to claim 1, wherein a hold groove is formed in at least one of an inner peripheral edge of said cylinder end plate and in the outer peripheral surface of said first shaft in an intermediate portion at a position opposed to the inner peripheral edge of said cylinder end plate, and an annular piston ring and an elastic ring for elastically pressing said piston ring are fitted in said hold groove.

5. A damper device according to claim 1, wherein spline grooves formed in a central edge portion of said cam plate and spline keys are formed on the outer peripheral surface of said first shaft in an intermediate portion, said spline grooves and said spline keys being engaged with each other.

6. A damper device according to claim 1, wherein outer diameters of said elastic member and said thrust bearing are set to be sufficiently smaller than an inner diameter of said cylinder tube.

7. A damper device according to claim 6, wherein a spacer in the annulus form is further disposed between said piston end plate and said cylinder end plate.

8. A damper device according to claim 7, wherein said elastic member comprises a conical plate spring, and two conical plate springs as elastic members are disposed in series in said pressure chamber between said spacer and said thrust bearing.

9. A damper device according to claim 1, wherein recesses formed in said first cam surface are each semielliptical in sectional shape.

* * * * *